United States Patent [19]

Finney et al.

[11] Patent Number: 5,065,037

[45] Date of Patent: Nov. 12, 1991

[54] CORROSION RESISTANT REFRACTIVE AND ADSORPTIVE TYPE OPTICAL LIQUID LEVEL SENSORS

[75] Inventors: Mark J. Finney; Kevin B. Stukey, both of Tonawanda, N.Y.

[73] Assignee: Conax Buffalo Corporation, Buffalo, N.Y.

[21] Appl. No.: 487,953

[22] PCT Filed: Oct. 20, 1988

[86] PCT No.: PCT/US88/03685

§ 371 Date: Apr. 17, 1990

§ 102(e) Date: Apr. 17, 1990

[87] PCT Pub. No.: WO90/01682

PCT Pub. Date: Feb. 22, 1990

[51] Int. Cl.$^5$ ............................................ G01N 15/06
[52] U.S. Cl. ................................. 250/577; 73/293; 340/619
[58] Field of Search .............. 250/577, 575, 900, 901, 250/902; 356/134–136, 442; 73/290 R, 293; 340/618, 619

[56] References Cited

U.S. PATENT DOCUMENTS

| | | | |
|---|---|---|---|
| 4,201,471 | 5/1980 | Pitt et al. | 250/575 |
| 4,223,231 | 9/1980 | Sugiyama | 250/577 |
| 4,233,493 | 11/1980 | Nath | 219/354 |
| 4,275,295 | 6/1981 | Menninger et al. | 250/901 |
| 4,344,429 | 8/1982 | Gupton et al. | 250/577 |
| 4,366,384 | 12/1982 | Jensen | 250/577 |
| 4,440,022 | 4/1984 | Masom | 73/293 |
| 4,485,856 | 12/1984 | Dulian et al. | 141/198 |
| 4,665,391 | 5/1987 | Spani | 340/619 |
| 4,680,475 | 7/1987 | Tansony et al. | 250/577 |
| 4,764,671 | 8/1988 | Park | 250/577 |
| 4,857,050 | 8/1989 | Lentz et al. | 250/577 |

FOREIGN PATENT DOCUMENTS 2035561  6/1980  United Kingdom.

OTHER PUBLICATIONS

"Optical Switch Uses Reflection to Monitor the Level of Liquid", Product Engineering, 9/68, pp. 81–82.

Primary Examiner—David C. Nelms
Assistant Examiner—Michael Messinger
Attorney, Agent, or Firm—Sommer, Oliverio & Sommer

[57] ABSTRACT

Two types of optical liquid level sensor are disclosed. In the first refractive-type (20,65), light is selectively refracted by the particular fluid(s) in a plug recess between primary and secondary detectors ($D_1, D_2$). The output signal from either detector indicates whether the sensor is above or below the liquid level. The signals of the respective detectors are cross-compared and used to corroborate one another. In the second absorptive-type (100), light at a particular wavelength is passed through a body chamber (86'), which is exposed to the liquid whose level is to be sensed. Such light is selectively absorbed by the liquid. A detector (D) is arranged to measure the intensity of such light as has passed through the chamber, and to indicate the level of liquid in said chamber.

12 Claims, 4 Drawing Sheets

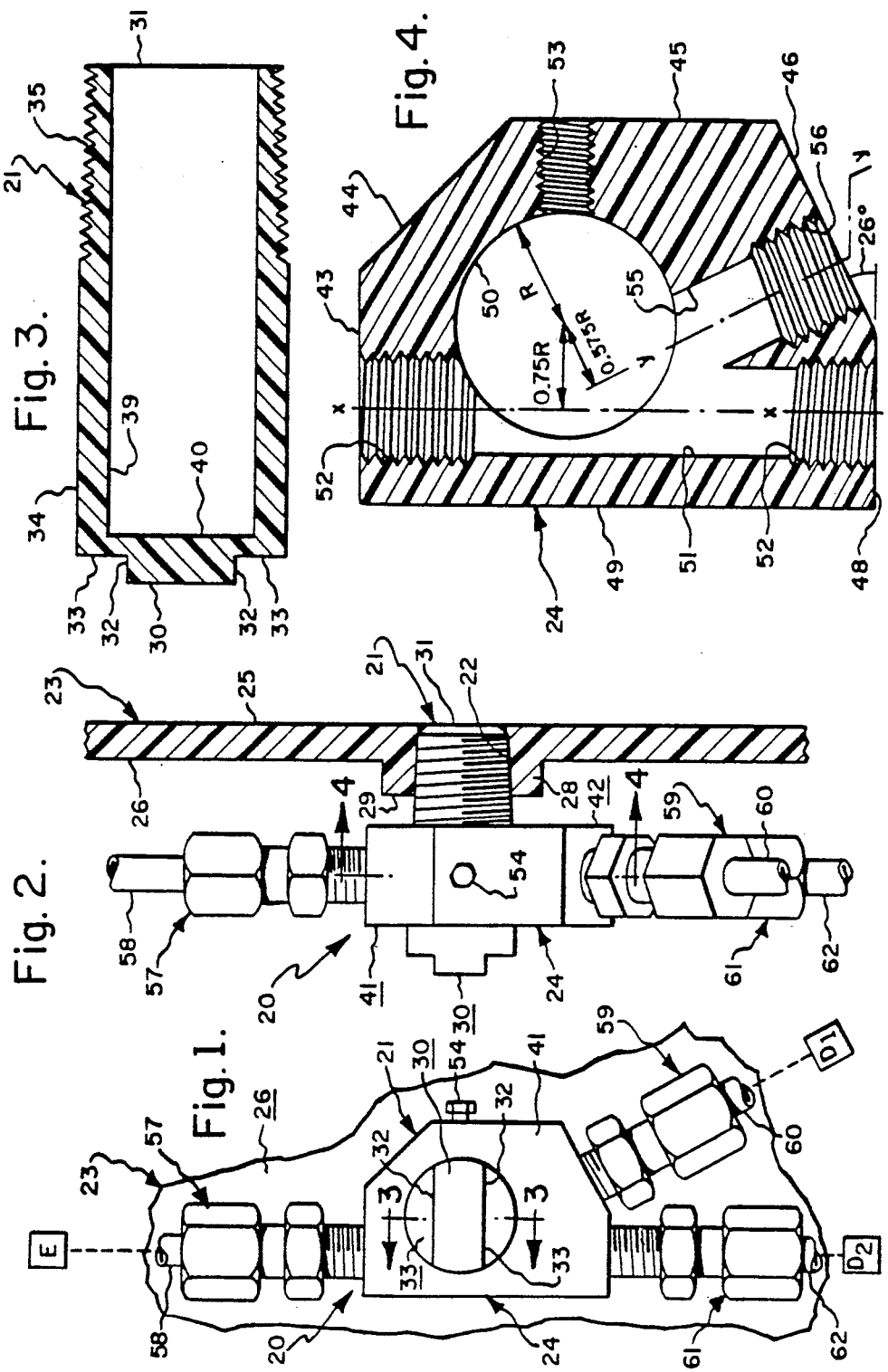

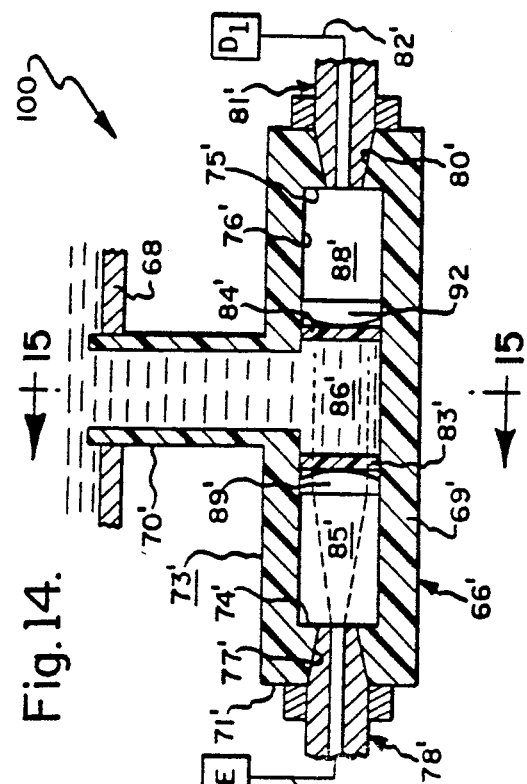

CORROSION RESISTANT REFRACTIVE AND ADSORPTIVE TYPE OPTICAL LIQUID LEVEL SENSORS

TECHNICAL FIELD

This invention relates generally to the field of optical liquid level sensors, and, more particularly, to improved refractive-type and absorptive-type optical liquid level sensors which are particularly adapted for use with various corrosive fluids that might chemically attack the normal materials (e.g., glass, sapphire, etc.) of which optical components are conventionally made.

BACKGROUND ART

It is often desired to determine the level of a particular liquid in a tank, container, or some other type of vessel. In some applications, a suitable gas (e.g., air, vapor, etc.) may exist in the head space above the liquid. In other applications, another less-dense liquid (e.g., oil) may float on the surface of the particular liquid (e.g., water).

Many techniques exist for measuring or monitoring the level of a liquid in a container. Among non-optical techniques, the most common are the familiar sight gauge, and various float-operated mechanisms.

In recent years, various additional techniques have been developed to optically determine the level of such liquids. According to one technique, a conventional optical fiber is provided with prismatic end in the form of a conical tip which is formed such that the angle of incidence ($\theta_i$) of light propagated along the fiber and striking the tip surface is greater than the "critical angle" ($\theta_c$) of such tip material with respect to air, but less than the "critical angle" of such material with respect to the particular liquid whose level is to be sensed. Hence, when the tip is above the surface of the liquid, substantially all of the light transmitted through the fiber will be reflected internally back through the fiber toward a suitable photo-detector. However, when the probe tip is submerged, light will be refracted into the liquid. Hence, the intensity of the light returned to the detector may be used to indicate whether the probe tip is above or below the surface of the liquid. This and other optical techniques are shown and described in Rakucewicz, "Fiber-Optic Methods of Level Sensing", *Sensors* (December 1986) [at p. 5 et seq.].

While these techniques may work with non-corrosive fluids and/or with some fluids at room temperature, other fluids are known to chemically attack the materials of which many optical components are formed. For example, hydrofluoric acid (HF) will chemically attack glass, and sulfuric acid ($H_2SO_4$) will attack sapphire ($Al_2O_3$). Hence, optical components made of such materials are unsuited for exposure to these corrosive liquids. Such corrosive fluids are commonly stored in tanks made of a polytetrafluouroethylene perfluouroalkoxy material, commonly known as "Teflon PFA" and manufactured by E. I. du Pont de Nemours & Co. (Inc.), Wilmington, Del. 19898. While this material is relatively immune to chemical attack by such fluids, one can not, as a practical matter, use conventional optical components (e.g., sapphire, glass, etc.) therewith.

Because of this, it has been proposed to formulate specially-configured sensor tips of such "Teflon PFA" material. See e.g., Tregay, "Optical Liquid Level Sensor", International Patent Application No. PCT/US 88/00907 filed 22 Mar. 1988, the aggregate disclosure of which is hereby incorporated by reference, and assigned to the assignee of the present application. While this type of sensor is capable of reliable operation (e.g., can produce a dry-to-wet signal ratio of more than 20:1 for air, water at room temperature) when there is a clear and distinct transition between the liquid and the gas thereabove, additional considerations come into play when the tanks, upon which such sensors are mounted, are heated and/or when heated liquid is pumped into such tanks. For example, vapor may form or condense and/or gas bubbles may collect on the probe tip. Such vapor, bubbles and/or condensation due to temperature differentials can result in the sensor tip outer surface being exposed to a mixed gas/liquid phase. Since the principle of "total internal reflection" versus refraction for a particular probe tip geometry, hinges on the relative indices of refraction of the probe material and the fluid that wets the tip outer surface, the consequence of exposing the tip surface to such mixed gas/liquid phase is that the intensity of the ideally-high "dry" optical return signal falls, thereby reducing the effective dry-to-wet signal ratio. Indeed the dry-to-wet signal ratio appear to vary inversely with temperature. Accordingly, it would be desirable to provide an improved optical liquid level sensor having reduced sensitivity to vapor, films, fog and condensation droplets, and therefore having reduced sensitivity to the temperature of the serviced fluid(s) and other operational considerations.

DISCLOSURE OF THE INVENTION

This invention provides various improved forms of refractive-type and absorptive-type optical liquid level sensors, and also provides improved methods of determining the level of a particular liquid.

According to one aspect, the invention broadly provides an improved optical liquid level sensor, which includes: a body having a recess and having a surface facing into the recess and adapted to be exposed to a particular liquid whose level is to be determined. The body has a first window positioned on said surface and through which light may be transmitted into the recess, and has a second window positioned on the surface and through which light may exit the recess. The second window is so positioned and arranged relative to the first window as to receive light passing through the first window only when a point on the first window is submerged in the liquid. This aspect also includes a light source, transmitting means for transmitting light from the source through the first window into the recess, and primary receiving means for receiving light passing through the second window. Hence, the intensity of light received by the primary receiving means may indicate whether such point on the first window is submerged in the liquid. If desired, a primary detector may be employed to produce a primary electrical signal as a function of the intensity of the light received by the primary receiving means. In a preferred embodiment, a third window is provided on the surface at a location such that, when the point on the first window is above the surface of the liquid, light will be refracted through such third window toward a secondary detector. The signals produced by the primary and secondary detectors may be cross-compared to corroborate one another. Light entering the body recess may be selectively refracted from one window to another as a function of the level of liquid, and/or the intensity of light exiting the recess may be diminished by absorption as it passes through the various fluid(s) in the recess.

Thus, in use, the refractive forms of the improved sensor perform the unique method of determining the level of liquid in a body having a recess and having a surface facing into the recess and adapted to be exposed to the particular liquid whose level is to be sensed. The body has a first window positioned on the surface and through which light may enter the recess, and has a second window positioned on the surface and through which light may exit the recess. The second window is so positioned and arranged relative to the first window as to receive light passing through the first window only when a sensing point on the first window is submerged in the liquid. While optional, the preferred form of the body has a third window positioned on the surface and so arranged with respect to the first window as to receive light passing through the first window when the sensing point is above the surface of the liquid. Thus, this improved method broadly comprises the steps of: transmitting light into the recess through the first window, refracting such light toward the second window only when the sensing point is submerged in the liquid, optionally refracting such light toward the third window when the sensing point is not submerged in the liquid, and measuring the intensity of light passing through at least one of the second and third windows, thereby to indicate whether the sensing point is above or below the surface of the liquid.

The absorptive forms of such apparatus, when used, perform the method which comprises the steps of: transmitting light through the first window into the recess, selectively absorbing a particular wavelength of such light as a function of the volume of liquid in the recess, transmitting light from the recess through the second window, and measuring the intensity of light passing through the second window, thereby to indicate the volume of liquid in the recess as a function of such measured light intensity.

Accordingly, the general object of this invention is to provide an improved optical liquid level sensor.

Another object is to provide such an improved sensor for use in measuring the level and/or volume of certain liquids, which would chemically attack conventional materials of which optical components are commonly made.

Another object is to provide improved methods for measuring the level of a particular liquid by refractive and absorptive techniques.

Still another object is to provide an improved optical liquid level sensor which is less sensitive to films, condensation droplets and/or two-phase conditions forming on an exposed probe tip.

These and other objects and advantages will become apparent from the foregoing and ongoing written specification, the drawings, and the appended claims.

BRIEF DESCRIPTION OF THE DRAWINGS

FIG. 1 is a fragmentary front elevational view of a first refractive-type form of improved optical liquid level sensor mounted on the upstanding wall of and enclosed tank.

FIG. 2 is a fragmentary right side elevational view thereof, showing the tank in cross-section.

FIG. 3 is an enlarged fragmentary longitudinal vertical sectional view of the plug, taken generally on line 3—3 of FIG. 1.

FIG. 4 is an enlarged fragmentary longitudinal vertical sectional view of the body, taken generally on line 4—4 of FIG. 2, with the plug and the inlet and outlet fittings removed.

FIG. 12 is a schematic horizontal longitudinal sectional view of a third absorptive-type optical liquid level sensor, this view depicting the intensity of the light path when the sensor cavity is above the surface of the liquid.

FIG. 13 is a fragmentary transverse vertical sectional view thereof, taken generally on line 13—13 of FIG. 12.

FIG. 14 is a schematic view, generally similar to FIG. 12, but showing the progressively diminishing intensity of the light path when the sensor cavity is filled with liquid.

FIG. 15 is a fragmentary transverse vertical sectional view thereof, taken generally on line 15—15 of FIG. 14.

MODE(S) OF CARRYING OUT THE INVENTION

Figure 7:
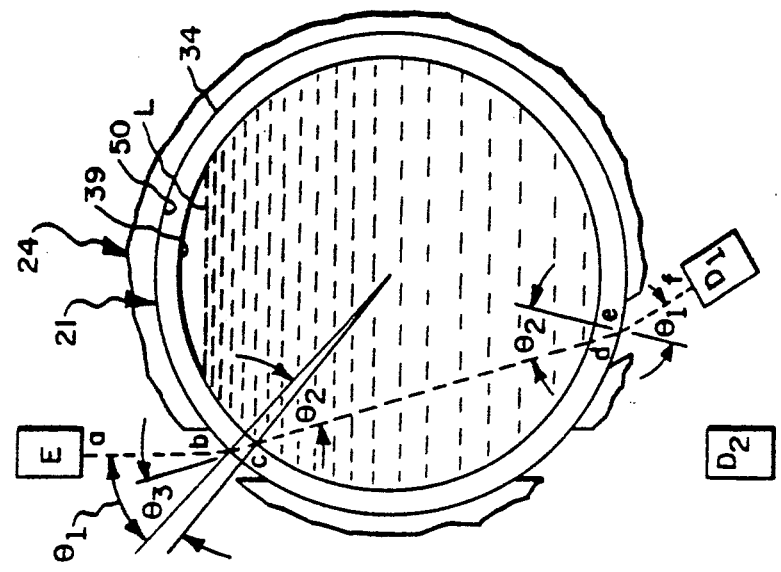
FIG. 7 is a schematic view, again generally similar to FIG. 5, but showing the light path from the source to the primary detector when the plug is substantially full of liquid.

At the outset, it should be clearly understood that like reference numerals are intended to identify the same parts, portions or surfaces consistently throughout the several drawing figures, as such parts, portions or surfaces may be further described or explained by the entire written specification, of which this detailed description is an integral part. Unless otherwise indicated, the drawings are intended to be read (e.g., cross-hatching, arrangement of parts, etc.) together with the specification, and are to be considered a portion of the entire written description of this invention. As used in the following description, the terms "horizontal", "vertical", "left", "right", "up", and "down", as well as adjectival and adverbial derivatives thereof (e.g., "horizontally", "rightwardly", "upwardly", etc.) simply refer to the orientation of the illustrated structure as the particular drawing figure faces the reader. Similarly, the terms "inwardly" and "outwardly" simply refer to the orientation of a surface relative to its axis of elongation, or axis of rotation, as appropriate.

Referring now to the drawings, this invention provides an improved optical liquid level sensor, which is particularly useful in determining or monitoring the level of a liquid which might corrode conventional optical materials (e.g., glass, sapphire, etc.), in a tank or container. However, it should be clearly understood that such serviced fluid(s) need not necessarily be corrosive caustic or acidic in nature. As used herein, the term "fluid" is intended to refer generically to either a liquid or a gas. Hence, the improved sensor may be used to monitor the level of a liquid, with a suitable gas or vapor thereabove. Alternatively, the inventive sensor may be used to determine the level of one particular liquid (e.g., water) with another liquid (e.g., oil) thereabove.

In any event, three presently-preferred embodiments of the improved liquid level sensor are disclosed herein. A first refractive form is depicted in FIGS. 1-7. A second refractive form is depicted in FIGS. 8-11, and a third absorptive form is depicted in FIGS. 12-15. These three forms will be described seriatim herebelow.

First Refractive Embodiment (FIGS. 1-7)

Referring now to FIGS. 1 and 2, a first form of the improved liquid level sensor, generally indicated at 20, is shown as including a plug 21 threaded into engagement with a tapped horizontal hole 22 provided through the upstanding side wall of an enclosed tank or container 23, and as also including a yoke-like body 24 mounted on this plug. The side wall 22 may be formed of any suitable material, but is shown as being specifically formed of Teflon PFA for use with hydrofluoric acid (HF), sulfuric acid ($H_2SO_4$), or the like. Glass, a common optical material, is chemically attacked by hydrofluoric acid (HF), while sapphire ($Al_2O_3$) is attacked by sulfuric acid ($H_2SO_4$). The side wall is shown as having a rightwardly-facing vertical inner surface 25 facing into the tank, and an opposite leftwardly-facing vertical outer surface 26. An integrally-formed cylindrical collar 28 is shown as extending leftwardly and outwardly from the side wall to provide a horizontally-thickened portion to accommodate mounting of the improved sensor thereon. Tapped horizontal hole 22 extends between side wall inner surface 25 and the distal annular vertical left end face 29 of collar 28.

As best shown in FIG. 3, plug 21 is a horizontally-elongated specially-configured somewhat cup-shaped member having a planar vertical left end face 30; an annular vertical right end face 31; and an outer surface which sequentially includes (from left-to-right in FIG. 3): a pair of upper and lower planar horizontal surfaces or "flats", severally indicated at 32, extending rightwardly from the upper and lower edges of left end face 30, a pair of upper and lower planar vertical chordal surfaces, severally indicated at 33, extending upwardly and downwardly therefrom, an outwardly-facing horizontal cylindrical surface 34, and an axial externally-threaded portion 35 continuing rightwardly therefrom to join right end face 31. If desired, threaded portion 35 and tapped hole 22 may be tapered slightly downwardly and inwardly, as shown, to facilitate the sealed mounting of the plug on the side wall. Alternatively, or in addition thereto, suitable O-rings (not shown) or the like, may be provided to insure a fluid-tight sealed engagement between the plug and the side wall. A recess is shown as extending leftwardly into the plug from its right end face. More particularly, this recess is sequentially bounded by: an inwardly-facing horizontal cylindrical surface 39 extending leftwardly from right end face 31 to join a rightwardly-facing circular vertical bottom surface 40.

As shown in FIG. 2, the right marginal end portion of the plug is threaded into fluid-tight sealed engagement with side wall tapped hole 22, with "flats" 32,32 being available for engagement by a suitable turning tool (not shown). Since the interior recess of the plug is also exposed to the fluid within the tank, it is also preferably formed of such Teflon PFA material. In this regard, extruded Teflon PFA has a characteristic white color, somewhat resembling the color of whole milk, whereas molded Teflon PFA has a substantially less-cloudy color, as if such milk had been diluted many times with water. In other words, molded Teflon PFA is substantially less cloudy and more transparent to the naked eye, than is the extruded version. Thus, the plug is preferably formed of molded Teflon PFA, when working with chemicals such as sulfuric acid and hydrofluoric acid, in order to permit the passage of light therethrough.

Referring now to FIGS. 1, 2 and 4, body 24 is shown as being a horizontally-elongated specially-configured block-like member having planar vertical front and rear faces 41,42, respectively (FIG. 2), separated by an outwardly-facing polygonal peripheral surface. More particularly, this outer surface sequentially includes (proceeding in a clockwise direction in FIG. 4): an upwardly-facing planar horizontal surface 43, an upwardly- and rightwardly-facing inclined planar surface 44, a rightwardly-facing planar vertical surface 45, a downwardly-and rightwardly-facing inclined planar surface 46, a downwardly-facing planar horizontal surface 48, and a leftwardly-facing planar vertical surface 49 continuing upwardly therefrom to join the left marginal end of upper surface 43. The body is provided with a central longitudinal through-hole, bounded by inwardly-facing horizontal cylindrical surface 50, which extends between its front and rear faces 41,42. A vertical through-hole 51 is drilled downwardly into the body from upper surface 43 to intersect through-bore wall 50 at an eccentric location and to continue downwardly therefrom to join bottom surface 48. More particularly, the vertical axis x—x of hole 51 occupies an arc distance of about 85° of bore wall 50. Otherwise stated, the vertical axis of hole 51 is spaced to the left of the center of through-bore 50 by an eccentric distance of about 0.75 R, where R is the radius of through-bore 50. The upper and lower marginal end portions of hole 51 are shown as being internally-threaded, as severally indicated at 52.

A tapped horizontal hole 53 extends leftwardly into the body from surface 45 to join bore wall 50 and to receive and accommodate a set screw 54 (FIGS. 1 and 2), which may be selectively tightened to prevent relative rotation between the body and plug. Another hole 55 is drilled upwardly and leftwardly into the body from surface 46 to intersect bore wall 50. The axis y—y of this hole is substantially perpendicular to surface 46, is inclined at an angle of about 26° with respect to the vertical, and is spaced from the center of bore wall 51 by an eccentric distance of about 0.575 R. The marginal portion of hole 55 adjacent surface 46 is internally-threaded, as indicated at 56. Axes x—x and y—y are arranged in a common vertical plane. In the preferred embodiment, body 24 is formed of an opaque material, such as a suitable black plastic. However, the body could also be formed of either molded or extruded Teflon PFA, colored or not, as desired.

As shown in FIGS. 1 and 2, the plug is threaded into fluid-tight sealed engagement with the side wall tapped hole 22, and the body is slipped thereon such that plug outer surface 34 is arranged to face body bore wall 50. When the body is in its desired operative position, set screw 54 may be selectively tightened to securely mount the body on the plug, and to prevent relative rotation therebetween. As best shown in FIGS. 1 and 2, a fitting, generally indicated at 57, is threaded into the upper portion of body hole 51 and communicates with a light source E via an optical fiber 58. Fitting 57 preferably includes a collimating lens (not shown) so that the rays of light exiting the fitting will be vertical and substantially parallel to the axis of hole 51. A second fitting, generally indicated at 59, is threaded into body hole 56 and communicates with a primary optical detector $D_1$ via an optical fiber 60. A third fitting, generally indicated at 61, is threaded into the lower portion of hole 51 and communicates with a secondary optical detector $D_2$ via an optical fiber 62. Fittings 59 and 61 may include focusing lenses (not shown) to focus received light into the ends of fibers 60, 62, respectively.

Figure 6:
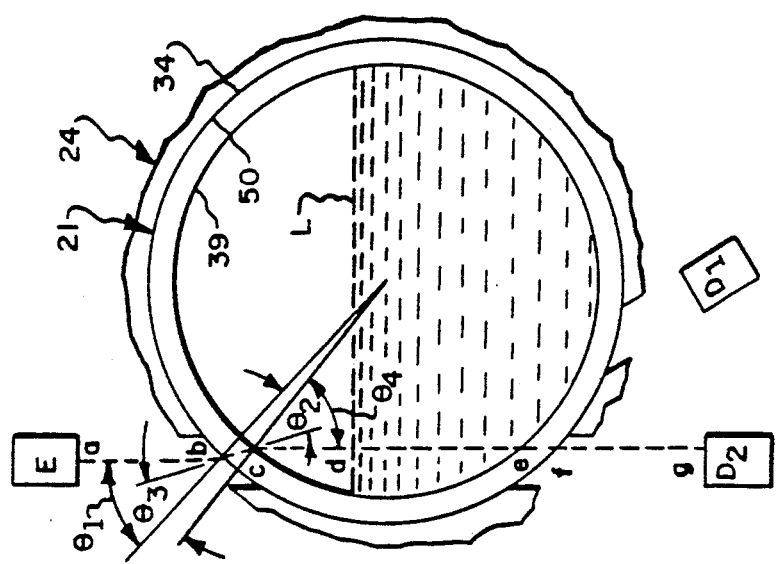
FIG. 6 is a schematic view, generally similar to FIG. 5, but showing the light path from the source to the secondary detector when the plug is about half-full.
Figure 5:
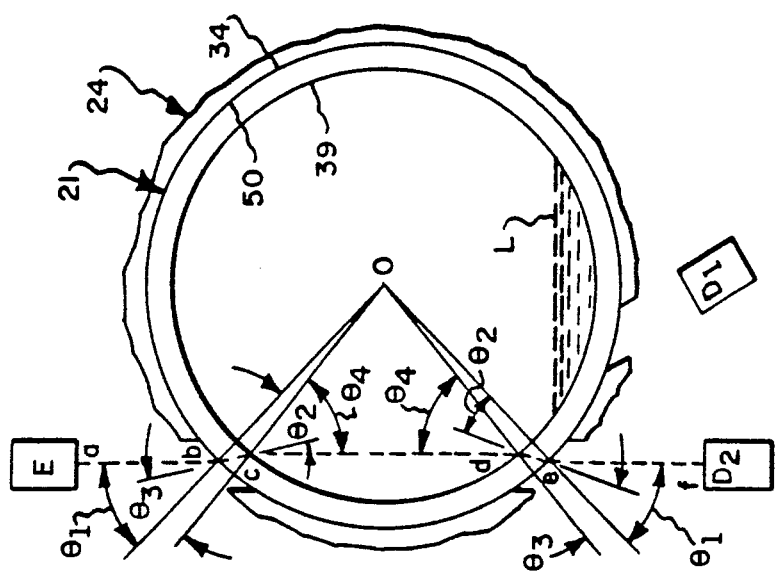
FIG. 5 is a schematic transverse vertical sectional view of the plug, showing the light path from the source to the secondary detector when the tank is substantially empty.

The operation of the first embodiment is comparatively illustrated in FIGS. 5–7. FIG. 5 depicts the path of a ray of light when the plug recess is substantially empty, although shown as containing some liquid. FIG. 6 shows such path when the plug recess is about half-full, and FIG. 7 shows such path when the plug recess is substantially full of liquid. The various liquid levels are indicated at L in these three figures. The portion of the translucent plug material which is aligned with the upper hole 51 constitutes a first window through which light emitted by source E may enter the plug recess, while the portions of the plug which are aligned with inclined hole 55 and with lower hole 51 constitute second and third windows, respectively, through which light may exit the recess.

The general equation governing the relationship between the angle of incidence ($\theta_i$) and the angle of refraction ($\theta_r$) is:

$$n_1 \sin\theta_i = n_2 \sin\theta_r \quad (1)$$

where $n_1$ is the index of refraction of the material, substance or fluid in which the angle of incidence occurs, and $n_2$ is the index of refraction of the material, substance or fluid into which the ray is refracted. For air, $n = 1.00$; for water, $n = 1.33$; for Teflon PFA, whether molded or extruded, $n = 1.35$.

Thus, in FIG. 5, a ray of light emitted from source E travels downwardly in air along path a—b (which is shown as being coincident with hole axis x—x) to fall incident at point b on the plug outer surface 34. If $n_a$ is the index of refraction of air, and $n_p$ is the index of refraction of the material of which the plug is formed, then $\theta_1$ is the angle of incidence (which is always measured with respect to a line normal to the surface on which the light falls incident), and $\theta_2$ is the angle of refraction (again measured with respect to such normal). Substituting this into equation (1):

$$n_a \sin\theta_1 = n_p \sin\theta_2 \quad (2)$$

Or, $$\sin\theta_2 = (n_a/n_p)\sin\theta_1 \quad (3)$$

Thus, the incident ray a—b will be refracted into the plug at point b along path b—c. Ray b—c will fall incident on plug inner surface 39 at point c at an angle of incidence $\theta_3$, and will be further refracted into the air above the surface of the liquid along path c—d, which lies at an angle of refraction $\theta_4$ relative to a radial line drawn to point c. Hence, $$n_p \sin\theta_3 = n_a \sin\theta_4 \quad (4)$$

Or, $$\sin\theta_4 = (n_p/n_a)\sin\theta_3 \quad (5)$$

Light refracted into the air along path c—d will again fall incident on plug inner surface 39 at point d. However, line c—d is the base of an isosceles triangle c—d—o, the other legs (o—d and o—c) of which are severally equal to the radius of surface 39. Since the base angles of an isosceles triangle are, by definition, equal, it follows that base angles d—c—o and c—d—o are necessarily equal. Since, angle d—c—o is angle of refraction $\theta_4$, angle c—d—o is therefore also equal to $\theta_4$. Thus, light along path c—d falls incident on point d of surface 39 at an angle of incidence $\theta_4$, and is refracted back into the plug along path d—e. Substituting into general equation (1), the angle of refraction $\theta_r$ of path d—e is calculated herebelow:

$$\sin\theta_r = (n_1/n_2)\sin\theta_i = (n_a/n_p)\sin\theta_4 = \sin\theta_3 \quad (6)$$

refracted ray d—e, which falls incident on point e of plug outer surface 50 at an angle of incidence $\theta_2$, will be further refracted through air along path e—f at an angle of refraction $\theta_1$ toward secondary detector $D_2$. Note that ray a—b—c—d—e—f is not directed toward primary detector $D_1$.

FIG. 6 shows another situation which the plug recess is slightly more than half-full of liquid. Light emitted from source E again travels downwardly along path a—b to fall incident at point b on plug outer surface 34. The angle of incidence at point b is again $\theta_1$, and the angle of refraction is again $\theta_2$. Thus, the refracted ray along path b—c will fall incident on point c of plug inner surface 39 at an angle of incidence $\theta_3$. Such incident ray will be refracted downwardly along path c—d at an angle of refraction $\theta_4$, all as previously described. Light along path c—d will fall incident on the horizontal upper surface of the liquid at an angle of incidence of zero. Hence, even though the respective indices of refraction of air and the liquid may be substantially different (e.g., $n_{air} = 1.00$ and $n_{water} = 1.33$), the angle of refraction along path d—e beneath the surface of the liquid will be substantially in line with path c—d because $\sin 0° = 0$. Thus, points c—d—e will lie along a substantially straight line. Light along path c—d—e will again fall incident on point e of plug inner surface 39, at an angle of incidence of $\theta_4$, and light will again be refracted through the plug along path e—f to point f on plug outer surface 34, and be further refracted along path f—g toward the secondary detector $D_2$. However, if the body is made of a material having an index of refraction substantially equal to the index of refraction of the liquid (e.g., $n_{water} = 1.33$, and $n_{TeflonPFA} = 1.35$), then the angle of refraction $\theta_r$ will be substantially equal to the angle of incidence $\theta_i$. Thus, points c—d—e—f will lie along a substantially straight line. Thus, even when the liquid level is between points c and e in FIG. 6, ray a—b—c—d—e—f—g will not refracted into hole 55 toward the primary detector $D_1$.

FIG. 7 depicts a third situation in which point c is beneath the surface of the liquid. Note that this does not necessarily mean that the plug is entirely filled with liquid, but only that point c is submerged. In this case, light emitted from source E along path a—b will fall incident on point b of the plug outer surface at an angle of incidence $\theta_1$, and will be refracted into the plug along path b—c at an angle of refraction $\theta_2$. This light along path b—c will fall incident on point c of plug inner surface 39 at an angle of incidence $\theta_3$. However, if the liquid has an index of refraction substantially equal to the index of refraction of the plug material (e.g., $n_{water}=1.33$, and $n_{TeflonPFA}=1.35$), then light will be refracted into the liquid along path c—d at an angle of refraction $\theta_r$ substantially equal to the angle of incidence $\theta_3$. Thus, light along path c—d will again fall incident on point d of surface 39, but will be refracted along path d—e into hole 55. Since points c—o—d form an isosceles triangle, the angle of incidence at point d will again be substantially equal to angle $\theta_3$. If the plug material and the liquid have substantially the same indices of refraction, then the angles of incidence and refraction will be substantially the same, and points b—c—d—e will substantially lie in a straight line. Light in path d—e falls incident on point e of plug outer surface 34 at an angle of incidence $\theta_2$, and is refracted through the air along path e—f toward primary detector $D_1$. Path e—f is substantially coincident with axis y—y of hole 55.

Thus, the first embodiment broadly contemplates that when the liquid level is below a particular sensing point (i.e., point c), light will not be refracted to enter hole 55 so as to be directed toward the primary detector. However, when the liquid level is only slightly above the particular point (i.e., point c) light emitted from the source will be refracted toward the primary detector. The intensity of such light received by the primary detector $D_1$ may therefore be used to indicate whether the liquid level is above or below the particular sensing point. Preferably, the detector produces an analog electrical signal indicative of the intensity of the light received thereby. Thus, the signal produced when the plug is empty may indicate the intensity of background or stray light entering the detector. Similarly, the signal produced when the plug is full may indicate a maximum signal due to the refracted ray and any background or stray light. These "dry" and "wet" signals may be used to calibrate the apparatus to a particular signal-to-noise ratio, which may be used to indicate reliably whether the point (i.e., point c) is submerged, or not.

The invention also contemplates that an alternative receiver opening and a secondary detector $D_2$ may be provided to receive the refracted ray, or at least part of it, when the sensing point (i.e., point c) is above the surface of the liquid. Thus, when the liquid is below the sensing point (i.e., point c) the signal produced by this secondary detector may be used for testing or monitoring the integrity of the optical path. Indeed, the signals produced by the primary and secondary detectors $D_1$, $D_2$ may be used to corroborate one another. For example, a strong signal produced by the primary detector indicates that the liquid is above point c. A simultaneous weak signal produced by the secondary detector may be used to corroborate the indicated strong signal from the primary detector. Conversely, a weak signal produced by the primary detector indicates that the liquid level is below the sensing point, and a simultaneous strong signal produced by the alternate detector corroborates that fact. Moreover, these two signals, when used in conjunction with one another, may indicate that the apparatus is functioning properly, and that the light path has not been occluded. Thus, the two signals, when used comparatively and in cooperation with one another, may be used to monitor, either sporadically or continuously, the integrity of the optical path, much in the same manner as an OR gate in electrical parlance. Another unique feature of this embodiment is that the apparatus is relatively insensitive to films and condensation forming on the plug inner surface 39, as when the liquid in the tank is heated, and is also relatively insensitive to "fogging" due to vapor in the head space or ullage above the liquid.

Second Embodiment (FIGS. 8–11)

Figures 8, 9, 10, 11:
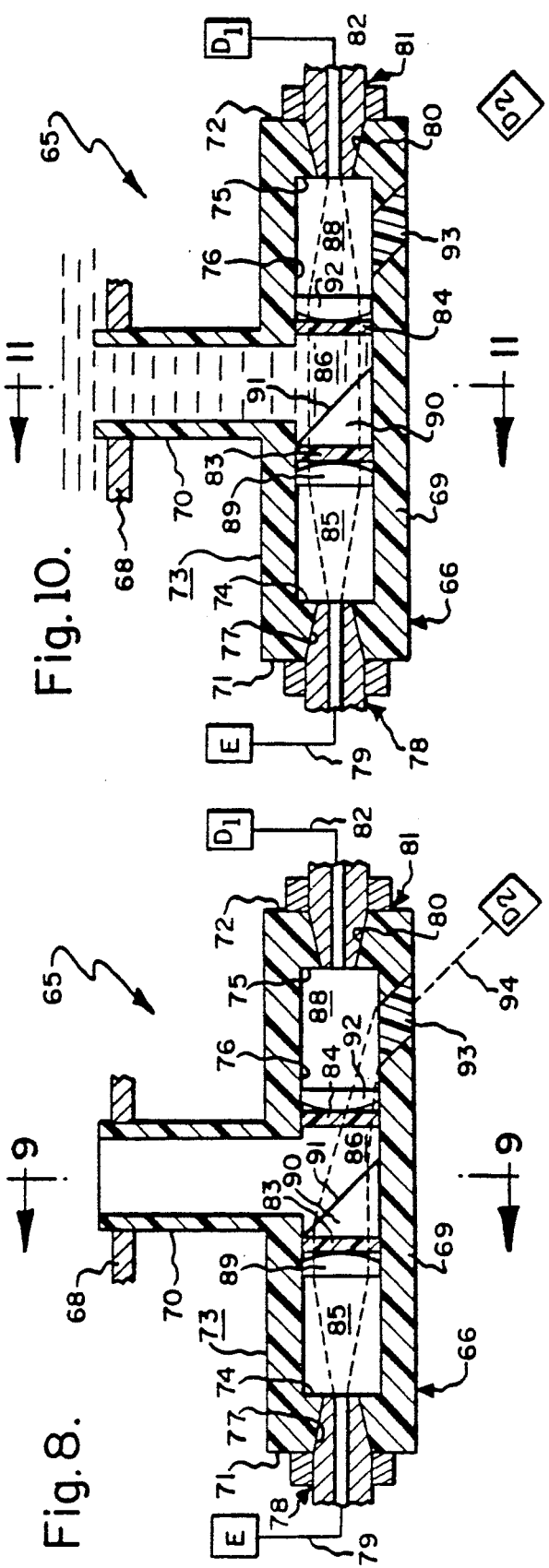
FIG. 8 is a schematic horizontal longitudinal sectional view of a second refractive-type optical liquid level sensor, this view showing the light path when the sensor cavity is above the surface of the liquid.
FIG. 9 is a fragmentary transverse vertical sectional view thereof, taken generally on line 9—9 of FIG. 8.
FIG. 10 is a schematic view, generally similar to FIG. 8, but showing the light path when the sensor cavity is submerged in the liquid.
FIG. 11 is a fragmentary transverse vertical sectional view thereof, taken generally on line 11—11 of FIG. 10.

Referring now to FIGS. 8 and 10, a second refractive-type optical liquid level sensor, generally indicated at 65, is schematically shown as including an inverted T-shaped hollow body 66 mounted on the side wall 68 of a tank (not fully shown), which contains a suitable liquid. The body is shown as being a specially-configured member having a horizontally-elongated central portion 69, and an upstanding tubular neck portion 70 communicating this central portion with the interior of the tank. The body central portion has annular vertical left and right end faces 71,72, respectively, and an outwardly-facing horizontal cylindrical surface 73 extending therebetween. The central portion also has an internal longitudinal recess bounded by annular vertical left and right end surfaces 74,75, and an inwardly-facing horizontal cylindrical surface 76 extending therebetween. The neck portion 70 is depicted as being a thin-walled cylindrical tube which joins central portion 69 to tank wall 68, and which communicates the central portion recess with the interior of the tank. An axial inwardly- and leftwardly-facing frusto-conical surface 77 extends between surfaces 71,74 to receive and accommodate an end fitting, generally indicated at 78, of an optical fiber 79 which communicates with a suitable light source E. An axial inwardly- and rightwardly-facing frusto-conical surface 80 extends between surfaces 72,74 to receive and accommodate an end fitting, generally indicated at 81, of another optical fiber 82 which communicates with a suitable primary light detector ($D_1$). A pair of axially-spaced left and right vertical disc-like windows 83,84 are sealingly secured to recess inner surface 76 about their peripheries, and are positioned so as to subdivide the central portion recess into a "dry" left chamber 85, a "wet" middle or intermediate chamber 86, and a "dry" right chamber 88.

A collimating lens 89 is positioned in the left chamber 85 to receive the diverging light rays, the envelope of which is indicated by the dashed lines, leaving incoming fiber 79, and to cause them to pass perpendicularly through first window 83. A prismatic element 90 is operatively arranged in the "wet" chamber 86. More particularly, element 90 has a leftwardly-facing vertical circular surface abutting window 83, has a peripheral cylindrical surface abutting central portion inner surface 76, and has an elliptically-shaped planar vertical surface 91 arranged at an acute included angle of about 45° with respect to the longitudinal axis of the central portion. A focusing lens 92 is operatively arranged within "dry" chamber 88 to direct light rays passing axially through second window 84 toward the entrance end of fiber 82. Another lateral or third window 93 is provided through the side wall of "dry" chamber 88, and communicates via fiber 94 with a secondary light detector $D_2$. The entire sensor body is formed of a suitable material which will resist chemical attack by the serviced fluid(s). Hence, in the example heretofore given, the sensor body may be formed of either extruded or molded Teflon PFA. Windows 83,84 and 93 are preferably formed of the optically more-transparent molded Teflon PFA. Thus, the windows may be either formed integrally with the body, if of the same material, or may be formed separately and suitably secured to the body, as by fusing or bonding. Lenses 89,92 reside in "dry" chambers 85,88, respectively, and therefore may be formed of glass or the like. Prismatic element 90, since it is exposed to the serviced fluid(s), is preferably formed of molded Teflon PFA. If the serviced fluid(s) are non-corrosive, body 66 may be formed of any suitable plastic, preferably opaque so as to minimize the amount of stray light entering the recess.

Light entering the sensor body from incoming fiber 79 will be collimated by lens 89, and will pass perpendicularly through window 83 to enter prismatic element 91. When the sensor body is above the liquid level, as shown in FIGS. 8 and 9, such that the middle chamber 86 is substantially filled with a air, light rays passing through element 90 will be refracted at element surface 91 downwardly and leftwardly away from element 90 through focusing lens 92 and lateral window 93 to enter fiber 94 and be directed toward the secondary detector $D_2$.

FIGS. 10 and 11 depict the "wet" middle chamber as being substantially filled with liquid. The index of refraction of water (i.e., $n_{water} = 1.33$) is substantially the same as the index of refraction of Teflon PFA (i.e. $n_{TeflonPFA} = 1.35$). Hence, when the middle chamber 86 is substantially submerged in liquid, the angle of refraction ($\theta_r$) from surface 91 into the liquid will be substantially the same as the angle of incidence ($\theta_i$), and light passing through focusing lens 92 will be directed toward fiber 82 for transmission to the primary detector $D_1$. If "wet" chamber 86 is only partially full of liquid, then light below the surface of the liquid will be refracted toward the second window, while light above the surface of the liquid will be refracted toward the lateral window.

Each detector is arranged to measure the intensity of the optical signal received thereby, and, preferably produces an analog electrical signal. Thus, for example, a "low" signal produced by primary detector $D_1$ indicates that lens surface 91 is above the liquid level, a "high" signal indicates that such surface is below the liquid level, and an "intermediate" signal indicates that the lens surface is only partially submerged. Conversely, a "high" signal produced by secondary detector $D_2$ indicates that lens surface 91 is above the liquid, a "low" signal indicates that the lens surface is submerged, and an "intermediate" signal indicates that the lens surface is only partly submerged. The output signals of the respective detector may be appropriately calibrated. As with the first embodiment, the signal received by the primary and secondary detectors may be used cooperatively and in conjunction with one another, again much like an OR gate in electrical parlance, to monitor the optical integrity of the light path.

Third Embodiment (FIGS. 12-15)

Referring now to FIGS. 12 and 14, a third absorptive-type optical liquid level sensor, generally indicated at 100, is schematically shown as including a body 66' mounted on the side wall of a tank, the side wall again being indicated at 68. Body 66' is substantially identical to body 66 of the second embodiment, except that prismatic lens 90, third window 93, fiber 94 and secondary detector $D_2$ have all been omitted. Otherwise, body 66' is the same as body 66, and the primes of the same reference numerals are again used to indicate the corresponding parts, portions or surfaces previously described.

However, whereas the first and second embodiments caused light to be selectively refracted between the second and third windows, depending upon whether the liquid level was above or below the sensing point on the first window, this third embodiment does not operate on the principle of refraction. Rather, it operates on the principle that certain liquids, notably water and acids, will absorb particular wavelengths, in the infrared and near-infrared regions of the optical spectrum, of light traveling therethrough.

FIG. 12 depicts the situation in which the sensor body is shown as being above the surface of the liquid, and middle chamber 86' is filled with air. Hence, light from source E will be transmitted into "dry" chamber 85' via fiber 79' and fitting 78'. Collimating lens 89' will cause the diverging light rays exiting fitting 89' to pass normally (i.e., perpendicularly) through first window 83' to enter middle chamber 86'. Such rays will pass through the air in chamber 86', and through second window 84'. Lens 92' will focus such received rays toward the receiving end of fitting 81', which communicates via fiber 82' with detector D. This detector is arranged to produce an electrical output signal as a function of the intensity of light, at the particular wavelength, received thereby. The magnitude of this signal is indicative of the extent to which light, at such wavelength, has been absorbed in the optical path from the source E to the detector D.

FIG. 14 illustrates an alternative situation when the sensor middle chamber 86' is substantially filled with the liquid. Unlike air, the liquid will absorb light at the particular wavelength as a function of the length of the fluid through which it must pass. Hence, while the light path from source E through first window 83' is the same as previously described, the intensity of such light entering chamber 86' is shown as progressively diminishing as it travels through the liquid. The path from second window 84' to the detector is the same as in FIG. 12.

Thus, this form operates on the principle that light, at a particular wavelength, will be selectively absorbed as it passes through the liquid. Hence, the intensity of light, at such wavelength, as sensed by the detector may indicate whether the middle chamber 86' is above or below the surface of the liquid. The loss in intensity, at the wavelength, per unit length (l) may be expressed as:

$$dB/l = (20/L)\log(V_d/V_w) \qquad (7)$$

where dB/l represents the loss in intensity at such wavelength (expressed in decibels) per unit length, L is the axial length of middle chamber 86' between windows 83', 84', $V_d$ is the signal produced by the detector when chamber 86' is above the surface of the liquid (i.e., "dry"), and $V_w$ is the signal produced by the detector when chamber 86' is full of liquid (i.e., "wet").

Modifications

The invention contemplates that many and varied changes and modifications may be made.

For example, the plug and/or body may be formed of any suitable material. The light source may typically be a laser diode, an LED, or the like. If the serviced fluid(s) are corrosive of conventional optical materials (e.g., glass, sapphire, etc.), the plug and/or body may be formed of any suitable material which is substantially immune to chemical attack, such as Teflon PFA in the case of hydrofluoric acid or sulfuric acid. The method and apparatus are not limited to use with corrosive fluids, such as nitric acid ($HNO_3$), sulfuric acid ($H_2SO_4$), phosphoric acid ($H_3PO_3$), hydrofluoric acid (HF), buffered hydrofluoric acid ($NH_4F$), potassium hydroxide (KOH) and the like, and may be used with a wide variety of other liquids and/or gases. Thus, while the principle of the invention has been described with respect to air and water, it should be clearly understood that these fluids are only exemplary.

The plug of the refractive-type sensors shown in FIGS. 1-11 should be, of course, be transparent or at least translucent, so as to permit light to enter and exit the plug recess through the various windows. However, the body itself may be formed of any suitable material, and may be opaque to minimize the introduction of stray extraneous light into the plug recess.

The body recess need not necessarily be bounded by an inwardly-facing cylindrical surface. Such surface may be semi-cylindrical, formed of some other surface of revolution, polygonal, or part-arcuate and part-polygonal, as desired, so long as the windows are positioned appropriately with respect to one another. At a minimum, only one detector need be employed to measure the intensity of light received thereby, although two are preferred for cross-comparison and corroboration of the signal produced by either. The accompanying electronics (not shown) may provide for continuous, intermittent or sporadic self-monitoring of the optical path, as desired.

Surface 91 may, if desired, be specifically inclined at or greater than the critical angle ($\theta_c$) so with respect to air that all of the light entering lens 90 will be reflected internally toward lateral window 93, as appropriately repositioned, when surface 91 is exposed to air. The "critical angle" is that angle at which the phenomenon of "total internal reflection" occurs. Such "critical angle" may be calculated according to the equation:

$$\sin \theta_c = (n_a/n_p) \quad (8)$$

where $n_a$ and $n_p$ are the refractive indices of air and the prismatic element material, respectively. Thus, if element 90 is formed of Teflon PFA (i.e., n=1.35), the "critical angle" of this material with respect to air would be about 48°. The "critical angle" of Teflon PFA with respect to water is about 80°. Hence, if element surface 91 is between 48° and 80°, the "critical angles" of Teflon PFA with respect to air and water, respectively, then all of the light entering element 90 will be reflected internally of the element toward lateral window 93 when element surface 91 is exposed to air, but will be refracted toward second window 84, lens 92 and the receiving end of out-going fiber 82 when element surface 91 is exposed to water. Thus, the refractive-type second embodiment contemplates that the prismatic element may be formed so as to either use the principle of refraction, or the principle of "total internal reflection", as desired, when middle chamber 86 is filled with gas. The use of "total internal reflection" form, as an alternative to the refractive embodiment, is optional and may be susceptible to fogging, film formation and the like on surface 91.

In the absorptive-type third embodiment, the liquid must be capable of absorbing a particular wavelength of light emitted by the source, and the detector must be capable of measuring the intensity of received light at such wavelength.

It will thus be seen that the improved refractive-type and absorptive-type liquid level sensors disclosed and claimed herein offer the desired capability of reduced sensitivity to the presence of vapor and fog in the head space above the liquid, to the formation of films and condensation droplets on an exposed probe tip, and to the temperature of the fluid(s). The refractive-type sensor operates not on the principle of "total internal reflection" vis-a-vis refraction per se, but on the principle that light must be refracted through a volume of fluid along a particular arc distance to a receiving point. The absorptive-type sensor also operates on the principle that light must pass through a volume of fluid. Hence, the improved devices require the presence of a volume of fluid, as opposed to a mere wetting of a surface. Indeed, at elevated temperatures, the absorptive-type sensor offers wet/dry signal ratios on the order of 100:1, and the refractive-type sensor offers wet/dry signal ratios on the order of 20:1. These values should be compared with the reflective/refractive-type disclosed in said International Patent Application No. PCT/US88/00907, which offered a signal ratio of about 3:1 at such temperatures, with phosphoric acid.

It should also be understood that the principle of the present invention is not limited to the particular structural forms disclosed herein. For example, if an upstanding cylindrical tank or container were to be formed of a suitable material, such as Teflon PFA, the first and second windows (and optionally the third window as well) could be positioned on, formed integrally with, or be a part or portion of, the side wall such that a beam of light would be directed, either diametrically or chordally, across the tank. Hence, depending upon the liquid level, such beam could be selectively refracted between the second and third windows, for transmission to the primary and secondary detectors. If such tank were to have an upstanding rectangular or polygonal side wall, the light beam could be directed across any transverse dimension, or diagonally, between two walls forming a corner, or the like.

Therefore, while certain preferred embodiments of the improved optical liquid level sensors have been shown and described, and certain changes and modifications thereof discussed, persons skilled in this art will readily appreciate that various additional changes and modifications may be made without departing from the spirit of the invention, as defined and differentiated by the following claims.

We claim:

1. A corrosion-resistant optical liquid level sensor adapted to determine the level of liquid in a container formed of polytetrafluorethylene perfluoralkoxy material, comprising:

a light source;

said container having first, second and third windows severally formed of said material;

transmitting means for transmitting light from said source through said first window into said container;

primary detection means operatively arranged to measure the intensity of light passing through said second window;

secondary detection means operatively arranged to measure the intensity of light passing through said third window; and comparator means for monitoring the integrity of the optical path between said source and said primary and secondary detection means as a function of the intensities of light measured by said primary and secondary detection means.

2. A corrosion-resistant optical liquid level sensor as set forth in claim 1 wherein said container is formed of molded polytetrafluorethylene perfluoralkoxy material.

3. A corrosion-resistant optical liquid level sensor as set forth in claim 1 wherein said primary detection means is arranged to produce a primary electrical signal as a function of the intensity of light received by said primary detection means.

4. A corrosion-resistant optical liquid level sensor as set forth in claim 3 wherein said secondary detection means is arranged to produce a secondary electrical signal as a function of the intensity of light received by said secondary detection means.

5. A corrosion-resistant optical liquid level sensor as set forth in claim 4 wherein the magnitude of each of said electrical signals is substantially proportional to the intensity of light received by the associated detection means.

6. A corrosion-resistant optical liquid level sensor as set forth in claim 5 wherein said comparator means is arranged to monitor the integrity of said optical path as a function of the sum of said primary and secondary electrical signals.

7. A corrosion-resistant optical liquid level sensor as set forth in claim 1 wherein said primary detection means is arranged on said container at a position to receive light transmitted through said first window when said first window is submerged in said liquid.

8. A corrosion-resistant optical liquid level sensor as set forth in claim 7 wherein said secondary detection means is arranged on said container at a position to receive light transmitted through said first window when said first window is not submerged in said liquid.

9. A corrosion-resistant optical liquid level sensor as set forth in claim 1 wherein a particular wavelength of said light is absorbed by said liquid.

10. A corrosion-resistant optical liquid level sensor as set forth in claim 9 wherein said primary and secondary detection means are arranged to measure the intensity of light as said particular wavelength.

11. The method of determining the level of liquid in a container, said container being formed of a polytetrafluorethylene perfluoralkoxy material and having a surface facing into said container, said container also having a first window forming a portion of said surface and through which light may enter said container and having second and third windows forming portions of said surface and through which light may exit said container, said second and third windows being spaced from one another, which method comprises the steps of:
transmitting light into said container through said first window;
directing light passing through said first window to said second window when said first window is submerged in said liquid;
directing light passing through said first window to said third window when said first window is not submerged in said liquid;
measuring the intensity of such directed light passing through said second window;
measuring the intensity of such directed light passing through said third window; and
comparing the measured intensities of light passing through said second and third windows;
thereby to measure the integrity of the optical paths between said windows as a function of said measured light intensities.

12. The method of determining the level of liquid in a container, said container being formed of a polytetrafluorethylene perfluoralkoxy material and having a surface facing into said container and adapted to be exposed to the particular liquid the level of which is to be sensed, said container having a first window forming a portion of said surface and through which light may enter said container and also having a second window forming another portion of said surface and through which light may exit said container, the optical path between said windows being unaffected by the nature of fluid in said container, which method comprises the steps of:
transmitting light through said first window into said container;
selectively absorbing a selected wavelength of said light as a function of the fluid in said container;
transmitting light from said container through said second window; and
measuring the intensity of light passing through said second window at said selected wavelength;
thereby to indicate whether said first window is above or below the level of liquid in said container.

* * * * *